(12) United States Patent
Bjontegaard

(10) Patent No.: US 7,280,598 B2
(45) Date of Patent: Oct. 9, 2007

(54) METHOD FOR VECTOR PREDICTION

(76) Inventor: Gisle Bjontegaard, Haukeliveien 12, Oppegard, Norway N-1415 (NO)

( * ) Notice: Subject to any disclaimer, the term of this patent is extended or adjusted under 35 U.S.C. 154(b) by 449 days.

(21) Appl. No.: 10/722,479

(22) Filed: Nov. 28, 2003

(65) Prior Publication Data

US 2004/0146110 A1    Jul. 29, 2004

(30) Foreign Application Priority Data

Nov. 27, 2002   (NO) .................................. 20025707

(51) Int. Cl.
*H04N 7/18* (2006.01)
(52) U.S. Cl. ............................. 375/240.16; 375/240.17
(58) Field of Classification Search ............................. 375/240.11–240.19
See application file for complete search history.

(56) References Cited

U.S. PATENT DOCUMENTS 6,122,318 A * 9/2000 Yamaguchi et al. ........ 375/240

| | | | |
|---|---|---|---|
| 2001/0004385 A1 | 6/2001 | Okumura et al. | |
| 2001/0026590 A1 | 10/2001 | Kang et al. | |
| 2001/0031004 A1* | 10/2001 | Kim et al. ............. | 375/240.16 |
| 2002/0039386 A1 | 4/2002 | Han et al. | |

FOREIGN PATENT DOCUMENTS

EP    0 874 526    10/1998
WO    WO01/99437   12/2001

OTHER PUBLICATIONS

D. S. Turaga, et al., IEEE Transactions on Circuits and Systems for Video Technology, vol. 11, No. 10, 11 pages, "Estimation and Mode Decision for Spatially Correlated Motion Sequences", Oct. 2001.

* cited by examiner

*Primary Examiner*—Anand Rao

(57) ABSTRACT

A method for prediction of the motion vector of a pixel block in a video picture that is to be coded. The actual motion vectors of two adjacent blocks close to the uppermost left corner of the block are selected as candidates for the prediction. One additional block, also adjacent to the block, is selected to decide which of the motion vectors to be used as the prediction. The vector difference to the motion vector of the decision block is decisive for the final selection.

20 Claims, 1 Drawing Sheet

METHOD FOR VECTOR PREDICTION

BACKGROUND OF THE INVENTION

1. Field of the Invention

The invention is related to video compression systems, and in particular to compression of digital video systems.

2. Discussion of the Background

Transmission of moving pictures in real-time is employed in several applications such as video conferencing, net meetings, TV broadcasting and video telephony.

However, representing moving pictures requires bulk information as digital video typically is described by representing each pixel in a picture with 8 bits (1 Byte). Such uncompressed video data results in large bit volumes, and can not be transferred over conventional communication networks and transmission lines in real time due to a limited bandwidth.

Thus, enabling real time video transmission requires a large extent of data compression. Data compression may, however, compromise the picture quality. Therefore, significant efforts have been made to develop compression techniques allowing real time transmission of high quality video over bandwidth limited data connections.

In video compression systems, a main goal is to represent the video information with as little capacity as possible. Capacity is defined with bits, either as a constant value or as bits/time unit. In both cases, a main goal is to reduce the number of bits.

The most common video coding method is described in the MPEG* and H.26* standards. The video data undergo four main processes before transmission, namely prediction, transformation, quantization and entropy coding.

The prediction process significantly reduces the amount of bits required for each picture in a video sequence to be transferred. It takes advantage of the similarity of parts of the sequence with other parts of the sequence. Because the predictor part is known to both the encoder and decoder, only the difference has to be transferred. This difference typically requires much less capacity for its representation. Further, the prediction is mainly based on picture content from previously reconstructed pictures where the location of the content is defined by motion vectors. The prediction process is typically performed on square block sizes (e.g., 16×16 pixels) as indicated in block M in FIG. 1. However, the size of the blocks may vary. This is indicated in the figure by the smaller adjacent blocks a, b, c and d.

In a typical video sequence, the content of the present block M would be similar to a corresponding block in a previously decoded picture. If no changes have occurred since the previously decoded picture, the content of M would be equal to a block of the same location in the previously decoded picture. In other cases, an object in the picture may have been moved so that the content of M is more equal to a block of a different location in the previously decoded picture. Such movements are represented by motion vectors (V). As an example, a motion vector of (3;4) means that the content of M has moved 3 pixels to the left and 4 pixels upwards since the previously decoded picture. For improved accuracy, the vector may also include decimals, requiring interpolation between the pixels.

To reduce the data size of the motion vectors before transmission, it is assumed that the movements in one block are quite similar to the movements of the adjacent blocks. Thus, a prediction (Vpred) of V is created based on the actual motion vectors of the adjacent blocks. As the motion vectors of the adjacent blocks are already known at the receiving side, only the difference (Vdiff) between the actual motion vector and the corresponding prediction have to be represented: Vdiff=V−Vpred. At the receiving side, the motion vector could then be recreated by V=Vpred−Vdiff.

In the ITU standards H.261 and H.262 and the ISO standards MPEG1 and MPEG2, Vpred is set equal to the motion vector of the adjacent block corresponding to block a in FIG. 1, i.e., it is assumed that the movements for a block is the same as for the adjacent block at the left hand side. In H.263 and MPEG4, three adjacent blocks are used to derive a prediction motion vector. Each component of the vector (horizontal and vertical) is derived separately by selecting the respective median of the components of the three vectors.

It is known from the publication US 2002/0039386 A1 a block matching processor and method for supporting block matching motion estimation at motion vector prediction modes using matching blocks of various sizes.

Further, it is known from US 2001/0031004 A1 a method and an apparatus for updating motion vector memories used for pre-diction of motion vectors within a video coding/decoding regime. The main issue in this document is how to store motion vectors in an efficient way for later use as current blocks. The prediction of the motion vectors is based on median calculation; hence this document does not describe a sufficiently accurate measurement method for motion vector prediction.

Still further there is known a solution (WO 01/99437 A2) where the prediction of motion vectors is based on median calculations. However, the main idea described in this document is to make a search within a smaller window in proximity to the predicted position.

The prediction vector derived according to the background art as described above has shown not to be sufficiently accurate. In addition, by selecting the prediction vector on a component by component basis, the vector may be constructed of components from different vectors resulting in a "fictional" motion vector.

SUMMARY OF THE INVENTION

Accordingly, one object of the present invention is to solve the above noted and other problems.

To achieve this and other objects, the present invention provides a novel method in video coding for determining a motion vector prediction associated with a target block of pixels representing a certain area of a video picture. The method includes the steps of calculating respective vector differences between a primary set of motion vectors or motion vector components respectively associated with a first number of blocks adjacent to the target block and one or more of a secondary set of motion vectors or motion vector components respectively associated with a second number of blocks also adjacent to the target block, and selecting a motion vector or motion vector component among said primary set of motion vectors corresponding to a smallest one of said vector differences as the motion vector prediction or a component of the motion vector prediction. The present invention also provides a novel computer program product.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawing, wherein:

FIG. 1 illustrates a 16×16 block with smaller sized adjacent blocks.

DETAILED DESCRIPTION OF THE PREFERRED EMBODIMENTS

Figure 1:
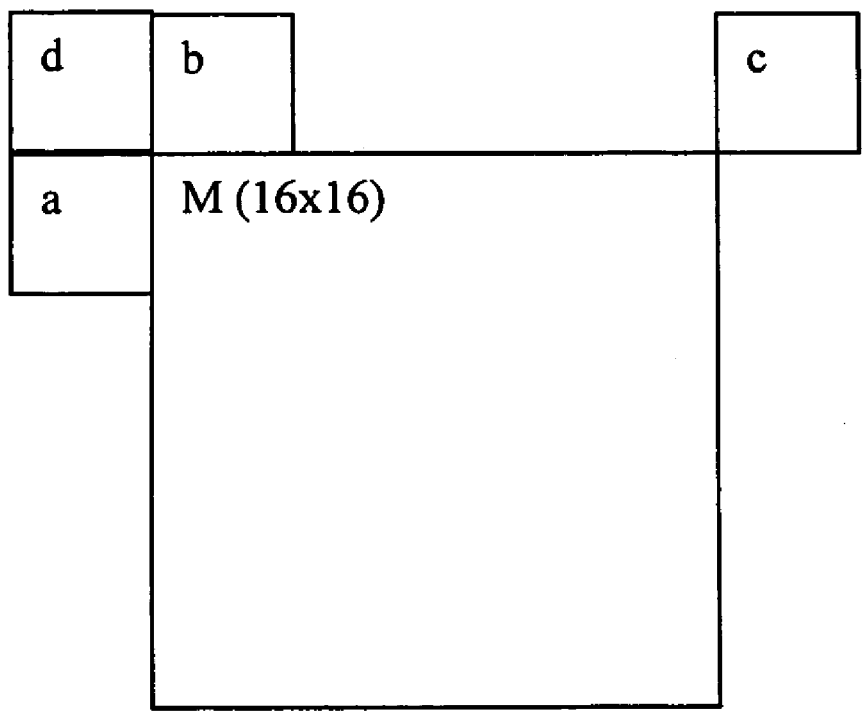

In the following, the present invention will be discussed by describing a preferred embodiment, and by referring to the accompanying drawing. However, a person skilled in the art will realize other applications and modifications within the scope of the invention as defined in the en-closed independent claim.

The present invention will now be described by an example, taking the notations of FIG. 1 into account. Assume that the blocks a, b, and c have the motion vectors $(x_1, y_1)$, $(x_2, y_2)$, $(x_3, y_3)$ and a prediction for the motion vector of block M is about to be determined. Thus, a method for decoding a motion vector M will be described. In this example, two of these three vectors are selected as candidates for the prediction. The selection of candidates may be fixed or based on experience, predefined criterions and/or the position of the block within the picture. Generally, the number of candidates may also vary, but in this example, there is only two, and the selection of a and b is fixed provided that M is not the uppermost or leftmost block in the picture. If the latter is the case, alternative selection or prediction will be used. Note that a and b may reside in a previous picture, but in this example, they are a part of the present picture.

It is further assumed that the motion vectors for a and b are known, and that one of them is chosen to be the prediction vector as a whole, even if a separate selection for each component is also a part of the present invention. Further, according to the present example, block c is selected to be decisive (the decision block) of the choice between a and b. C is selected because it is positioned in the right upper corner adjacent to block M, whereas a and b are positioned close to the opposite upper corner. Thus, the motion vector of c may provide a good indication of which motion vector is the best approximation to the motion vector of block M. Note that even if only one decision block is used here, several decision blocks could be used in the general case.

The block, a or b in this example, having the smallest vector difference related to motion vector of the decision block will preferably be selected as the motion vector prediction for M.

There are two preferred alternatives for calculating the vector difference. The idea behind the selection procedure for selecting the optimal motion vector prediction for M, is to select the block with the motion vector having the least vector difference compared to the motion vector of the decision block. Several methods apply when calculating these selection criteria. Two of them are shown in the following sections, both return a numerical value. This value will be used when deciding which block (a or c) to choose as the motion vector prediction for M, the smaller value is the best choice. The returned value will only have the function of a selection criterion, hence the value in itself does not have to be stored or transmitted. The first of the two alternatives calculates the squared sum of the difference of the respective components. Hence, the vector difference c–a and c–b would be calculated as follows:

$$\sqrt{(x_3-x_1)^2+(y_3-y_1)^2} \quad \sqrt{(x_3-x_2)^2+(y_3-y_2)^2}$$

As long as it is only a question regarding which of the two returned values is the smallest for the expression above, one can choose to cancel the radical sign. The second alternative calculates the sum of the absolute values of the difference of the respective components. The corresponding calculation for the vector difference c–a and c–b would be as follows:

$$|x_3-x_1|+|y_3-y_1| \quad |x_3-x_2|+|y_3-y_2|$$

In both cases, the motion vector having the smallest vector difference compared to the motion vector of c is selected as the prediction for the motion vector of block M.

In the general case, the number of vector candidates for the prediction is not limited to two as in the example above. In fact, any number of candidates can be used. Further, the number of decision vectors is neither limited to one. Thus, one set of vectors may be defined as the candidate set, while another set of vectors may be defined as the decision set.

This invention may be conveniently implemented using a conventional general purpose digital computer or microprocessor programmed according to the teachings of the present specification, as will be apparent to those skilled in the computer art. Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium including instructions which can be used to program a computer to perform a process of the invention. The storage medium can include, but is not limited to, an type of disk including floppy disks, optical disks, CD-ROMs, and magneto-optical disks, ROMs, RAMs, EPROMs, EEPROMs, magnetic or optical cards, or any type of pure software inventions (e.g., word processing, accounting, Internet related, etc.) media suitable for storing electronic instructions.

Obviously, numerous modifications and variations of the present invention are possible in light of the above teachings. It is therefore to be understood that within the scope of the appended claims, the invention may be practiced otherwise than as specifically described herein.

The invention claimed is:

1. A method in video coding for determining a motion vector prediction associated with a target block of pixels representing a certain area of a video picture, comprising the steps of:
    calculating respective vector differences between a primary set of motion vectors associated with a first number of blocks adjacent to the target block and one or more of a secondary set of motion vectors respectively associated with a second number of blocks also adjacent to the target block; and
    selecting a motion vector among said primary set of motion vectors corresponding to a smallest one of said vector differences or to a smallest sum of vector differences associated with the respective motion vectors of said primary set as the motion vector prediction.

2. The method according to claim 1, wherein the first number of blocks is localized close to a leftmost upper corner of the target block, and the second number of blocks is localized close to a rightmost upper corner of the target block.

3. The method according to claim 1, wherein the first number of blocks includes a first and a second block, and the second number of blocks includes a third block.

4. The method according to claim 3, wherein the motion vectors of said first, second and third blocks is $(x_1, y_1)$, $(x_2, y_2)$, and $(x_3, y_3)$, respectively.

5. The method according to claim 4, wherein the step of calculating respective vector differences between the motion vectors of said first and third blocks and between said second and third blocks includes calculating the following equations:

$$\sqrt{(x_3-x_1)^2+(y_3-y_1)^2} \sqrt{(x_3-x_2)^2+(y_3-y_2)^2}.$$

6. The method according to claim 4, wherein the step of calculating respective vector differences between the motion vectors of said first and third blocks and between said second and third blocks includes calculating the following equations:

$$|x_3-x_1|+|y_3-y_1| \quad |x_3-x_2|+|y_3-y_2|.$$

7. The method according to claim 1, wherein some blocks of said first number of blocks is included in said second number of blocks.

8. The method according to claim 2, wherein the first number of blocks includes a first and a second block, and the second number of blocks includes a third block.

9. The method according to claim 8, wherein the motion vectors of said first, second and third blocks is $(x_1, y_1)$, $(x_2, y_2)$, and $(x_3, y_3)$, respectively.

10. The method according to claim 2, wherein some blocks of said first number of blocks is included in said second number of blocks.

11. A computer readable storage medium encoded with computer executable instructions which causes a computer to implement a method of determining a motion vector prediction associated with a target block of pixels representing a certain area of a video picture, comprising:

calculating respective vector differences between a primary set of motion vectors associated with a first number of blocks adjacent to the target block and one or more of a secondary set of motion vectors respectively associated with a second number of blocks also adjacent to the target block; and selecting a motion vector among said primary set of motion vectors corresponding to a smallest one of said vector differences or to a smallest sum of vector differences associated with the respective motion vectors of said primary set as the motion vector prediction.

12. The computer readable storage medium according to claim 11, wherein the first number of blocks is localized close to a leftmost upper corner of the target block, and the second number of blocks is localized close to a rightmost upper corner of the target block.

13. The computer readable storage medium according to claim 11, wherein the first number of blocks includes a first and a second block, and the second number of blocks includes a third block.

14. The computer readable storage medium according to claim 13, wherein the motion vectors of said first, second and third blocks is $(X_1, y_1)$, $(x_2, y_2)$, and $(x_3, y_1)$, respectively.

15. The computer readable storage medium according to claim 14, wherein the step of calculating respective vector differences between the motion vectors of said first and third blocks and between said second and third blocks includes calculating the following equations:

$$\sqrt{(x_3-x_1)^2+(y_3-y_1)^2} \sqrt{(x_3-x_2)^2+(y_3-y_2)^2}.$$

16. The computer readable storage medium according to claim 14, wherein the step of calculating respective vector differences between the motion vectors of said first and third blocks and between said second and third blocks includes calculating the following equations:

$$|x_3-x_1|+|y_3-y_1| \quad |x_3-x_2|+|y_3-y_2|.$$

17. The computer readable storage medium according to claim 11, wherein some blocks of said first number of blocks is included in said second number of blocks.

18. The computer readable storage medium according to claim 12, wherein the first number of blocks includes a first and a second block, and the second number of blocks includes a third block.

19. The computer readable storage medium according to claim 18, wherein the motion vectors of said first, second and third blocks is $(x_1, y_1)$, $(x_2, y_2)$, and $(x_3, y_3)$, respectively.

20. The computer readable storage medium according to claim 12, wherein some blocks of said first number of blocks is included in said second number of blocks.

* * * * *

UNITED STATES PATENT AND TRADEMARK OFFICE
CERTIFICATE OF CORRECTION

| | | |
|---|---|---|
| PATENT NO. | : 7,280,598 B2 | Page 1 of 1 |
| APPLICATION NO. | : 10/722479 | |
| DATED | : October 9, 2007 | |
| INVENTOR(S) | : Bjontegaard | |

It is certified that error appears in the above-identified patent and that said Letters Patent is hereby corrected as shown below:

On the title page, Item (73), the Assignee information has been omitted. Item (73) should read:

-- (73) Assignee: Tandberg Telecom AS, Lysaker, Norway --

Signed and Sealed this

Eighteenth Day of December, 2007

JON W. DUDAS
*Director of the United States Patent and Trademark Office*